US010947818B2

(12) United States Patent
Wang

(10) Patent No.: US 10,947,818 B2
(45) Date of Patent: Mar. 16, 2021

(54) SYSTEM AND METHOD FOR DETECTION AND CONTROL OF THE DEPOSITION OF FLOW RESTRICTING SUBSTANCES

(71) Applicant: Qiliang Wang, Edmond, OK (US)

(72) Inventor: Qiliang Wang, Edmond, OK (US)

( * ) Notice: Subject to any disclaimer, the term of this patent is extended or adjusted under 35 U.S.C. 154(b) by 160 days.

(21) Appl. No.: 16/299,412

(22) Filed: Mar. 12, 2019

(65) Prior Publication Data

US 2019/0284906 A1 Sep. 19, 2019

Related U.S. Application Data

(60) Provisional application No. 62/642,765, filed on Mar. 14, 2018.

(51) Int. Cl.

| | |
|---|---|
| ***E21B 37/06*** | (2006.01) |
| ***F16L 55/24*** | (2006.01) |
| ***F17D 1/14*** | (2006.01) |
| ***F17D 1/18*** | (2006.01) |
| ***F17D 3/12*** | (2006.01) |
| ***E21B 49/08*** | (2006.01) |
| ***F17D 3/18*** | (2006.01) |
| *E21B 47/06* | (2012.01) |
| *E21B 47/07* | (2012.01) |
| *E21B 47/107* | (2012.01) |

(52) U.S. Cl.

CPC .............. *E21B 37/06* (2013.01); *E21B 49/08* (2013.01); *F17D 1/14* (2013.01); *F17D 1/18* (2013.01); *F17D 3/12* (2013.01); *F17D 3/18* (2013.01); *E21B 47/06* (2013.01); *E21B 47/07* (2020.05); *E21B 47/107* (2020.05); *E21B 49/0875* (2020.05)

(58) Field of Classification Search

CPC ........... E21B 41/02; E21B 37/06; F16L 55/24

See application file for complete search history.

(56) References Cited

U.S. PATENT DOCUMENTS 2,484,279 A * 10/1949 Folz ....................... G01N 17/00 73/86

2,760,584 A * 8/1956 Rohrback .............. E21B 41/02 166/243

(Continued)

OTHER PUBLICATIONS

Nan Zhang, et al., "A Novel Approach to the Study of CaCO3 Precipitation Kinetics on Carbon Steel Pipe", article, May 30-31, 2012, 17 pages, Aberdeen, UK.

(Continued)

*Primary Examiner* — Kenneth L Thompson

(74) *Attorney, Agent, or Firm* — Tomlinson McKinstry, P.C.

(57) ABSTRACT

A detection system for use with a pipeline network having a fluid flowing therethrough. The fluid contains an ingredient that deposits on the interior walls of the pipeline network. The detection system is interposed within the pipeline network and comprises a first fluid path and a second fluid path. A material is distributed throughout the interior of the second fluid path that is capable of inducing and accelerating the deposition of the fluid ingredient on the walls of the second fluid path. A sensor exposed to the second fluid path monitors changes in the path indicative of deposit build-up. The sensor communicates with a control system. The control system directs a chemical injector to introduce chemical inhibitors into the pipeline network to inhibit ingredient deposition on the walls of the pipeline network.

22 Claims, 6 Drawing Sheets

(56) References Cited

U.S. PATENT DOCUMENTS

| | | | | |
|---|---|---|---|---|
| 3,490,271 | A * | 1/1970 | Hays | G01N 17/00 73/86 |
| 3,601,079 | A * | 8/1971 | Giles | B01F 15/0206 114/67 R |
| 4,945,758 | A * | 8/1990 | Carpenter | E21B 41/02 73/86 |
| 6,797,149 | B2 | 9/2004 | Eden | |
| 9,095,736 | B2 * | 8/2015 | Kochelek | F16L 55/1683 |
| 9,772,206 | B2 | 9/2017 | Wee et al. | |
| 10,329,883 | B2 * | 6/2019 | Sarmiento Klapper | E21B 47/00 |
| 2004/0231862 | A1 * | 11/2004 | Kirn | A62C 37/50 169/16 |

OTHER PUBLICATIONS

Arnstein Wee, et al., "Multiphase meter capable of detecting scale on the pipe wall and correcting flow rate measurements", article, Oct. 2013, 21 pages, Norway.

Qiliang "Luke" Wang, et al., "Kinetics and Inhibition of Ferrous Sulfide Nucleation and Precipitation", article, May 14-15, 2014, 15 pages, Aberdeen, Scotland, UK.

Dennis Denney, "Kinetics and Inhibition of Ferrous Sulfide Nucleation and Precipitation", article, Sep. 2014, 4 pages.

Ping Zhang, et al., "Application of a novel tube reactor for investigation of calcium carbonate mineral scale deposition kinetics", article, Jul. 7, 2018, 12 pages, Houston, Texas.

* cited by examiner

SYSTEM AND METHOD FOR DETECTION AND CONTROL OF THE DEPOSITION OF FLOW RESTRICTING SUBSTANCES

SUMMARY

The present invention is directed to a system comprising a pipeline network formed from pipes having interior wall surfaces, and a fluid flowing through the pipeline network. The fluid has an ingredient that deposits on the interior wall surfaces at a base rate range. The system further comprises a detection system interposed in the pipeline network having two or more flow paths therethrough in a parallel flow relationship. The flow paths comprise a first fluid path and a second fluid path. The second fluid path has interior walls defining an environment in which the fluid ingredient deposits on the interior walls of the second fluid path at a rate greater than the base rate range. The detection system further comprises a sensor exposed to the second fluid path. The sensor is responsive to the deposition of the ingredient on the interior walls of the second fluid path.

DETAILED DESCRIPTION

Fluid recovered from the subsurface during oil and gas operations may contain an ingredient that deposits on production pipelines under certain circumstances. The fluid recovered from the subsurface may be crude oil, natural gas, or other known subsurface fluids. The ingredient contained in the fluid may be scale, wax, or other substances known to deposit on the interior walls of pipelines. The term "deposit" as used herein, means any deposition, formation, or growth of the ingredient on the pipeline interior walls.

The deposits can build up on the pipeline walls over time and significantly restrict the recovery of fluid from the subsurface. Additionally, deposit build-up may decrease production efficiency and increase equipment maintenance. It is known in the art that deposit formation on pipeline walls may be monitored using detection systems. If deposits are detected on the pipeline walls, chemicals may be delivered to the subsurface fluids that inhibit the continued formation of such deposits. Such chemicals are typically referred to as chemical "inhibitors". The volume of chemical inhibitors injected into the wellbore may vary depending on the level of deposit build-up detected.

Detection systems known in the art use electrochemical sensors to detect the presence of deposits within the main flow lines. The disadvantage of such systems is that the deposits must first start to form on the pipeline walls in order to be detected. Thus, fluid recovery may already be restricted as a result of deposit formation before chemical inhibitors are ever delivered to the subsurface fluid. Another disadvantage of these systems is that electrochemical sensors are very sensitive to their environment. Minor changes in temperature, pH, salinity or flow rate within the environment can generate measurement errors when detecting the deposition rate of the fluid ingredient.

The present disclosure is directed to a system that detects whether scale or wax will deposit on the production pipelines. If it is determined that deposits will form, chemical inhibitors are injected into the wellbore in order to prevent the deposits from ever forming. Thus, the system described herein aims to prevent the recovery of subsurface fluid from ever being restricted as a result of deposit formation.

Figure 1:
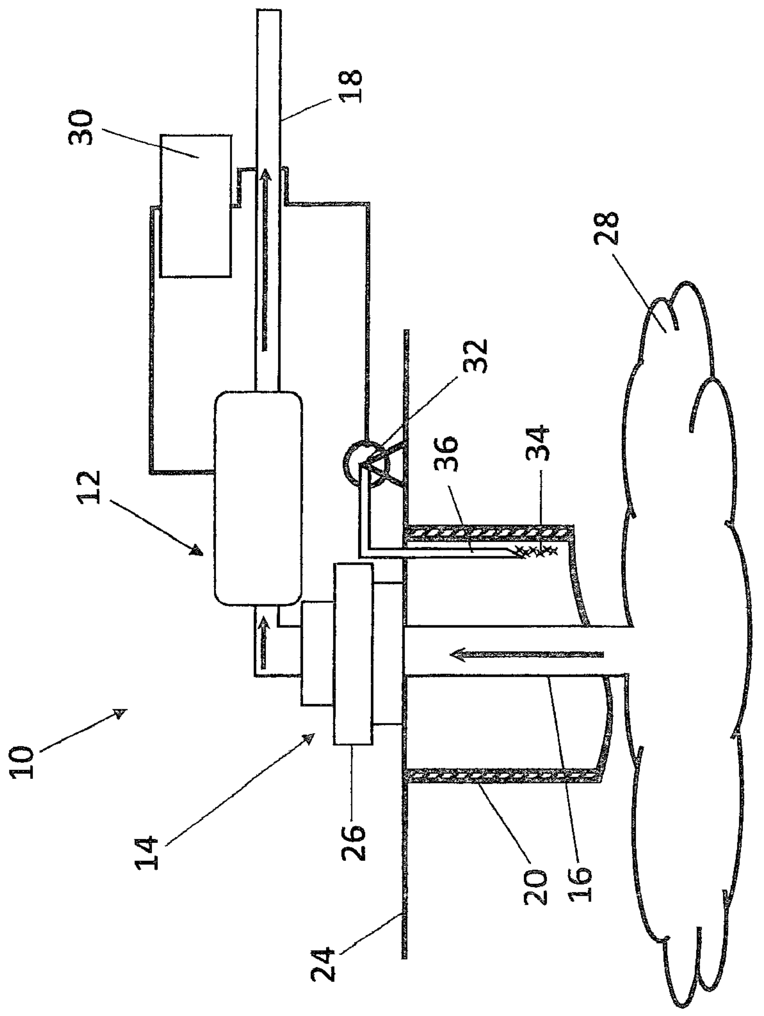
FIG. 1 is an illustration of an oil and gas production operation using a detection system.

Turning now to the figures, FIG. 1 shows a system to for use with a detection system 12. The detection system 12 is configured for incorporation into a pipeline network 14. The pipeline network 14 shown in FIG. 1 comprises a downhole production line 16 and a surface production line 18. The network 14 may further include other production equipment not shown in FIG. 1.

The downhole production line 16 is disposed within a casing 20 installed within a wellbore. The surface production line 18 is positioned on a ground surface 24 adjacent a wellhead 26. The downhole production line 16 pumps fluid from a well reservoir 28 to the surface production line 18. The surface production line 18 delivers the fluid to a desired midstream point where it may be further transported, as needed.

Continuing with FIG. 1, the detection system 12 is interposed in the surface production line 18. The detection system 12 is configured to communicate with a control system 30 located at the ground surface 24. Such communication may be accomplished wirelessly or by physical wires. The control system 30 is configured to communicate with a chemical injector 32 positioned adjacent the wellhead 26. Such communication may likewise be accomplished wirelessly or by physical wires.

The chemical injector 32 is configured to deliver one or more chemical inhibitors 34 to the fluid extracted from the well reservoir 28 via a tubular line 36. The tubular line 36 is disposed between the downhole production line 16 and the casing 20. The chemical inhibitors 34 are preferably delivered to a location proximate the opening of the downhole production line 16.

Figure 2:
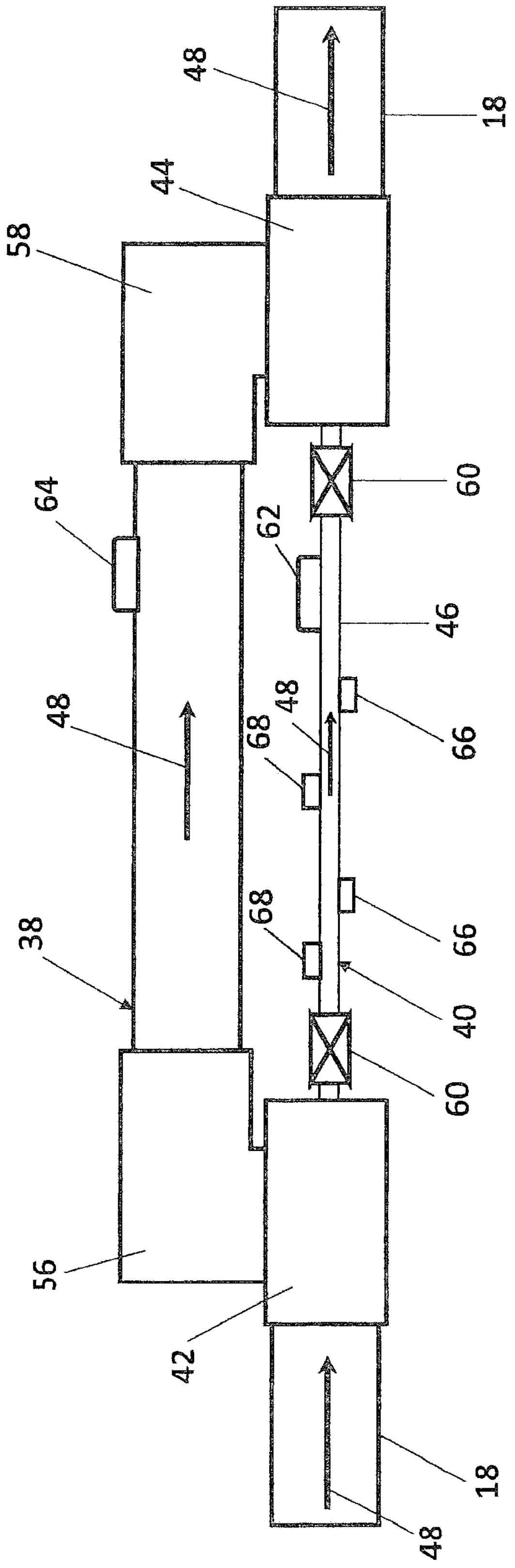
FIG. 2 is an elevational view of a detection system.

Turning to FIG. 2, the detection system 12 comprises a first fluid path 38 and a second fluid path 40. The second fluid path 40 comprises an inlet and outlet pipe section 42 and 44 joined by a channel 46. The inlet pipe section 42 is coupled to the surface production line 18 such that it interconnects the line 18 and the channel 46. Likewise, the outlet pipe section 44 is coupled to the surface production line 18 such that it interconnects the line 18 and the channel 46. In operation, fluid in the surface production line 18 flows into the second fluid path 40 and back into the surface production line 18, as shown by arrows 48.

Figure 3:
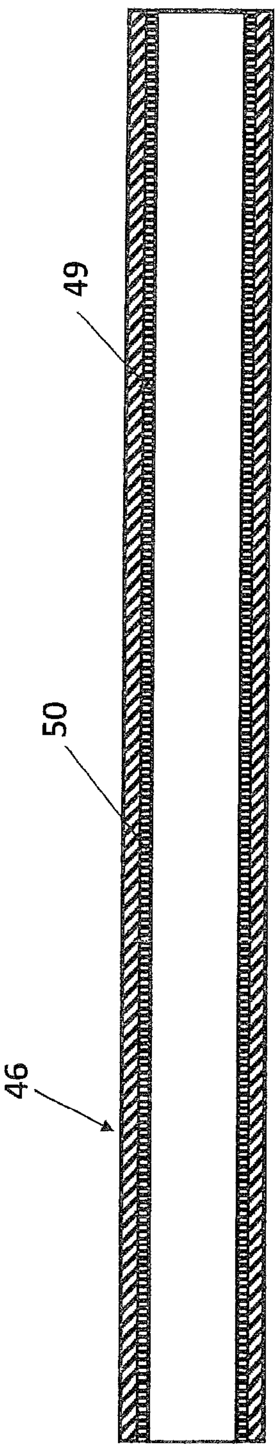
FIG. 3 is a cross-sectional view of a channel used with the detection system of FIG. 2. A coating is distributed through the interior of the channel.
Figure 4:
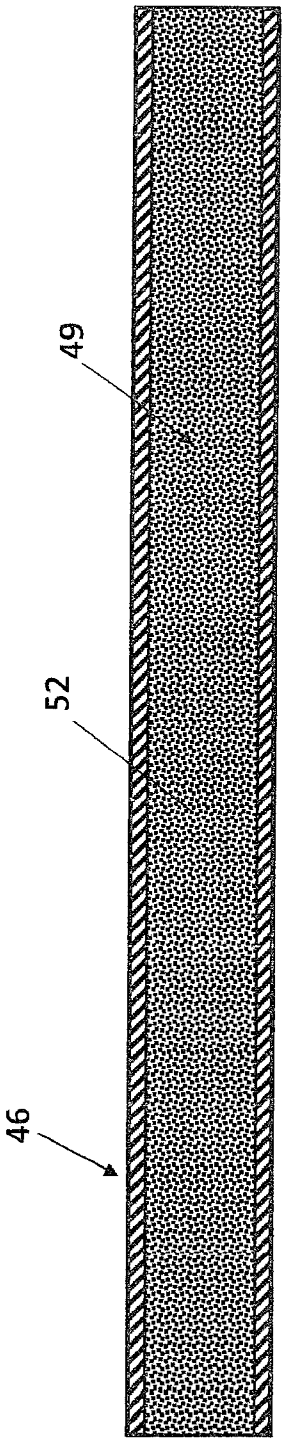
FIG. 4 is a cross-sectional view of a channel used with the detection system of FIG. 2. A plurality of packed particles are distributed through the interior of the channel.

With reference to FIGS. 2-4, the channel 46 contains a material 49 capable of inducing and accelerating the formation of ingredient deposits onto the interior walls of the channel 46. The material 49 may be applied to the inner walls of the channel 46 in the form of a coating 50, as shown in FIG. 3. Alternatively, the material 49 may be distributed throughout the interior of the channel 46 in the form of packed particles 52, as shown in FIG. 4. The material 49 may also contain a mixture of both a coating 50 and packed particles 52. The channel 46 has an internal diameter below that of the surface production line 18. Reducing the diameter of the channel 46 reduces the volume of fluid needed to saturate the material 49.

In operation, fluid flow within the pipeline network 14 results in ingredient deposits on the network's interior walls. These deposits occur at a base rate range. The base rate range is the rate at which the ingredient deposits during normal operation and without exposure to any chemical inhibitors 34. Because the channel 46 is within the pipeline network 14, these deposits will form on the interior walls of the channel 46 as well. However, because of the presence of material 49 within the channel 46, these deposits will form at a rate greater than the base rate range. Thus, deposits of ingredients within the channel 46 can be used to forecast the build-up of deposits of the same ingredient within the pipeline network 14 as a whole.

One fluid ingredient known to deposit on the interior walls of the pipeline network 14 is scale. Scale is a mineral salt deposit. Examples of minerals that are known to form scale are calcium carbonate, iron sulfides, barium sulfate and strontium sulfate. Scale is known to deposit at an accelerated rate when exposed to already formed scale. Thus, the material 49 may contain nano-particles or micro-structures of one or more different mineral materials.

Figure 7:
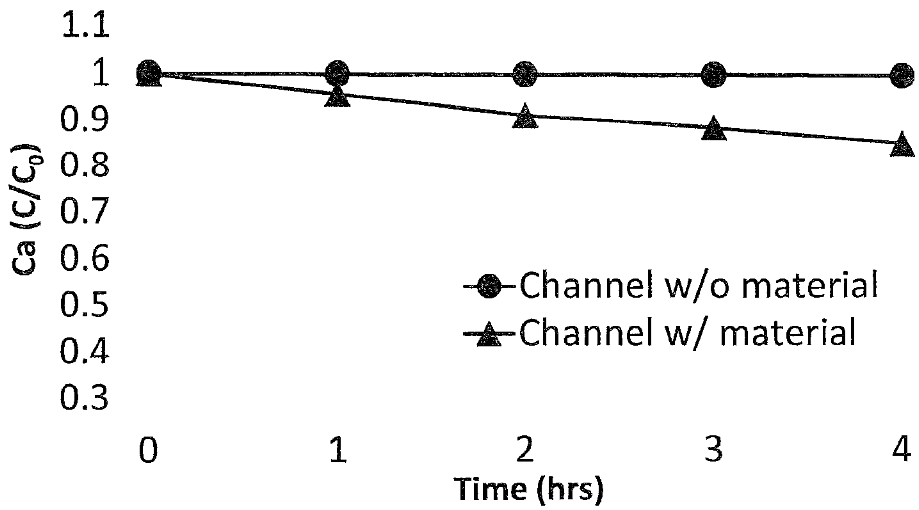
FIG. 7 is a graph showing an example of the decrease in concentration of calcium based minerals within a fluid flowing through a pipeline network over time.

One way to analyze the rate at which the ingredient deposits from fluid is to analyze the concentration of the ingredient within the fluid over time. The ingredient concentration with the fluid decreases as the ingredient deposits on the interior walls of the pipeline network 14. An example of the decrease in concentration of calcium based minerals within a fluid flowing through a pipeline network over time is shown in FIG. 7. The fluid exposed to the material 49 has a lower concentration of the minerals than the fluid not exposed to the material 49. Thus, the mineral deposits on the interior walls of the pipeline network at a greater rate when exposed to the material 49 than when not exposed.

Figure 8:
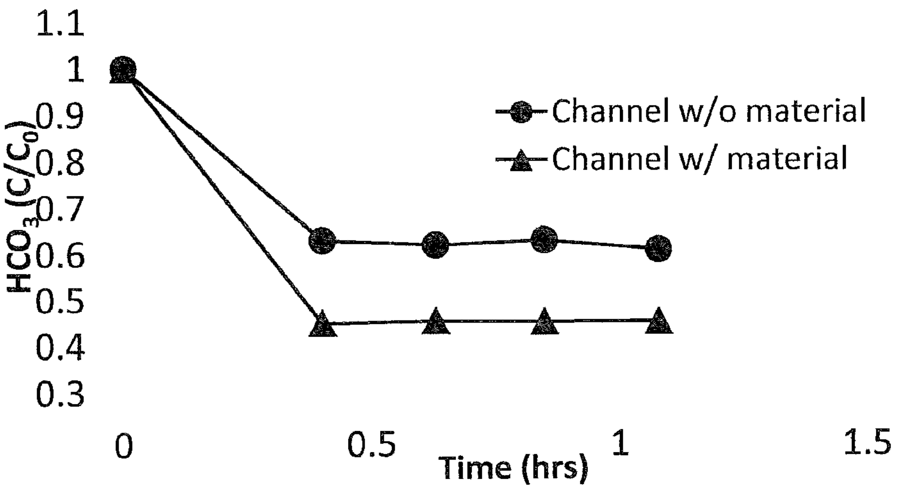
FIG. 8 is a graph showing an example of the decrease in concentration of bicarbonate based minerals within a fluid flowing through a pipeline network over time.

An example of the decrease in concentration of bicarbonate based minerals within a fluid flowing through a pipeline network over time is shown in FIG. 8. Like FIG. 7, the fluid exposed to the material 49 has a lower concentration of the minerals than the fluid not exposed to the material 49.

The other fluid ingredient known to deposit on the interior walls of the pipeline network 14 is wax. An example of a wax known to deposit from fluid recovered in oil and gas operations is paraffin wax. Wax is known to deposit from fluid at accelerated rates when exposed to hydrophobic substances, such as carbonaceous substances. Examples of carbonaceous substances known to induce wax deposition are carbon nanotubes or black carbon. Thus, the material 49 may contain nano-particles or micro-structures of one or more different hydrophobic substances. Other substances known to induce the deposition of other known deposits from fluid may also be included in the material 49.

Continuing with FIG. 2, positioned in parallel flow relationship to the second fluid path 40 is the first fluid path 38. The first fluid path 38 has interior walls and an inlet and outlet section 56 and 58. The inlet section 56 is coupled to the inlet pipe section 42 of the second fluid path 40. Likewise, the outlet section 58 is coupled to the outlet pipe section 44 of the second fluid path 40. In alternative embodiments, the inlet and outlet sections of the second fluid path may be coupled directly to the surface production line.

The first fluid path 38 is in fluid communication with the surface production line 18 and the second fluid path 40. The first fluid path 38 permits fluid to bypass the second fluid path 40 when flowing through the detection system 12. Without a bypass fluid path, the reduced diameter of the channel 46 will cause it to act as a choke point for fluid flow within the pipeline network 14. As deposits build within the channel 46, this choking effect will be enhanced. Thus, the first fluid path 38 allows fluid to continue flowing through the pipeline network 14 at a constant rate and without interruption of normal production operations.

The first fluid path 38 is shown positioned above the second fluid path 40 in FIG. 2. In alternative embodiments, the first fluid path 38 may be positioned below the second fluid path 40. Positioning the first fluid path 38 above the second fluid path 40 may be ideal when there is a low flow rate within the surface production line 18. In contrast, positioning the first fluid path 38 below the second fluid path 40 may be ideal when there is a high flow rate within the surface production line 18.

Continuing with FIG. 2, a plurality of valves 60 are attached to the channel 46 adjacent the inlet and outlet pipe sections 42 and 44. Closing the valves 60 isolates the channel 46 from the surface production line 18 and the first fluid path 38. If the flow rate of fluid through the surface production line 18 is low, it may be necessary to isolate the channel 46 until the flow rate increases. Alternatively, if excess deposit build-up blocks fluid flow within the channel 46, it may be necessary to remove the channel 46 and replace it with a new channel. That portion of the channel 46 between an adjacent pair of valves 60 may be configured for easy removability and replacement. In alternative embodiments, a plurality of valves may be attached to opposite sides of the first fluid path, in order to isolate the first fluid path from the flow of fluid within the pipeline network 14.

Continuing with FIG. 2, the detection system 12 further comprises a sensor 62 exposed to the channel 46. The sensor 62 is responsive to changes in the channel 46 due to deposit formation on the channel walls. The sensor 62 may be a flow sensor or a pressure sensor. If, for example, scale starts to deposit on the channel 46 walls, a fluid sensor would detect a reduced flow rate. A pressure sensor, if used instead, would detect an increased fluid pressure. The channel 46 may also be exposed to a temperature sensor in addition to the flow or pressure sensor.

Only one sensor 62 is shown in FIG. 2; however, a plurality of sensors may be exposed to the channel 46. The plurality of sensors may comprise a combination of fluid, pressure, and temperature sensors. The first fluid path 38 may also be exposed to one or more sensors 64 in order to compare the environment within the first fluid path 38 to that of the second fluid path 40. In such case, the one or more sensors 64 may match the number and type of the one or more sensors 62 used with the second fluid path 40.

With reference to FIGS. 1 and 2, in operation, the values measured by the sensors 62 and 64 are sent to the control system 30. The control system 30 receives data either wirelessly or via wires from the sensors 62 and 64 using a data acquisition system included in the control system. A processor also included within the control system 30 analyzes the values and determines if deposits have formed on the walls of the channel 46. The processor makes this analysis by comparing the initial flow rate, pressure, and/or temperature of the fluid within the channel 46 to the flow rate, pressure, and/or temperature of the fluid within the channel over time. If the processor determines that deposits have formed on the channel 46 walls, the processor will generate instructions for the chemical injector 32. The instructions may be sent to the chemical injector by the control system 30 automatically or upon human input.

The control system 30 is configured to direct the chemical injector 32 to inject a specified volume of chemical inhibitors 34 into the subsurface fluid. The chemical injector 32 may inject the chemical inhibitors 34 at any rate or interval directed by the control system 30 until the build-up risk is prevented or mitigated. The chemical injector 32 may be operated by a PC through USB or MODBUS ports, as well as manually operated.

The type of chemical inhibitor 34 injected into the subsurface fluid may vary depending on whether wax or scale is more likely to deposit on the pipeline network 14. Whether wax or scale is more likely to deposit can be determined by analyzing the temperature of the channel 46 at the time the sensor 62 detected a change in the channel 46 environment. The temperature of the channel 46 is important because wax and scale may deposit at different temperatures.

A plurality of heating components 66 may be attached to the channel 46 in order to vary its temperature. The heating components 66 may be controlled by the control system 30. The heating components 66 may be in the form of wire, tape, or other heat inducing elements. The components 66 may also be used to heat and clean wax from the channel 46 after the wax build-up has been detected and analyzed. Melted wax may be flushed from the channel 46 with the flowing fluid.

A plurality of ultrasonic components 68 may also be attached to the channel 46. The ultrasonic components may be, for example, an ultrasonic transducer. The ultrasonic components 68 clean the channel 46 by generating ultrasonic waves and cavitation bubbles inside the channel 46. The waves and bubbles can remove a wide variety of deposits, including scale. The removed scale can be flushed from the channel 46 with the fluid.

Figure 5:
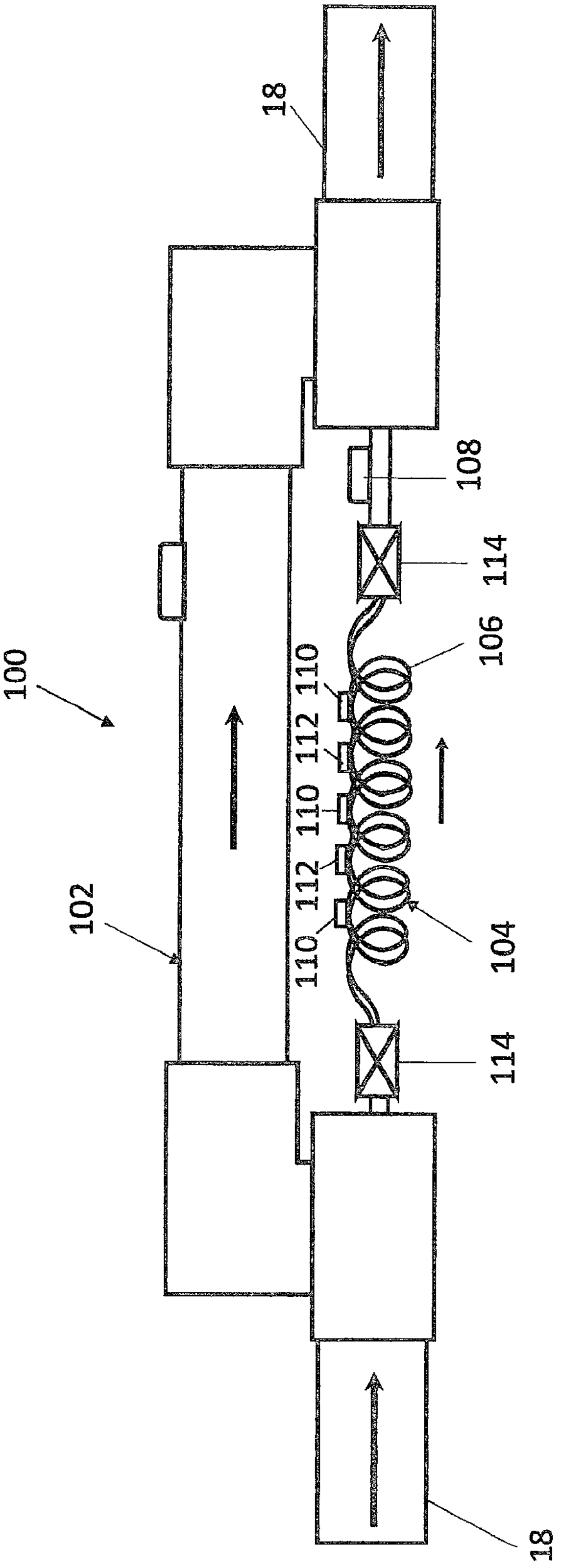
FIG. 5 is an elevational view of an alternative embodiment of a detection system.

Turning to FIG. 5, an alternative embodiment of a detection system 100 is shown. Like system 12, the system 100 is interposed in the surface production line 18 and comprises a first fluid path 102 and a second fluid path 104. The first fluid path 102 is identical to the first fluid path 38. The second fluid path 104 is identical to the second fluid path 40, with the exception of the shape of its channel 106. The channel 46 used with the second fluid path 40, is straight, as shown in FIG. 2. In contrast, the channel 106 is formed in the shape of a coil. Forming the channel 106 in the shape of coil provides the fluid with more exposure to the material 49. In further alternative embodiments, the channel may take on any shape desired.

Like the channel 46, the channel 106 may be exposed to a sensor 108 and have attached heating components 110 and ultrasonic components 112. A plurality of valves 114 may also be attached to opposite sides of the channel 106.

Figure 6:
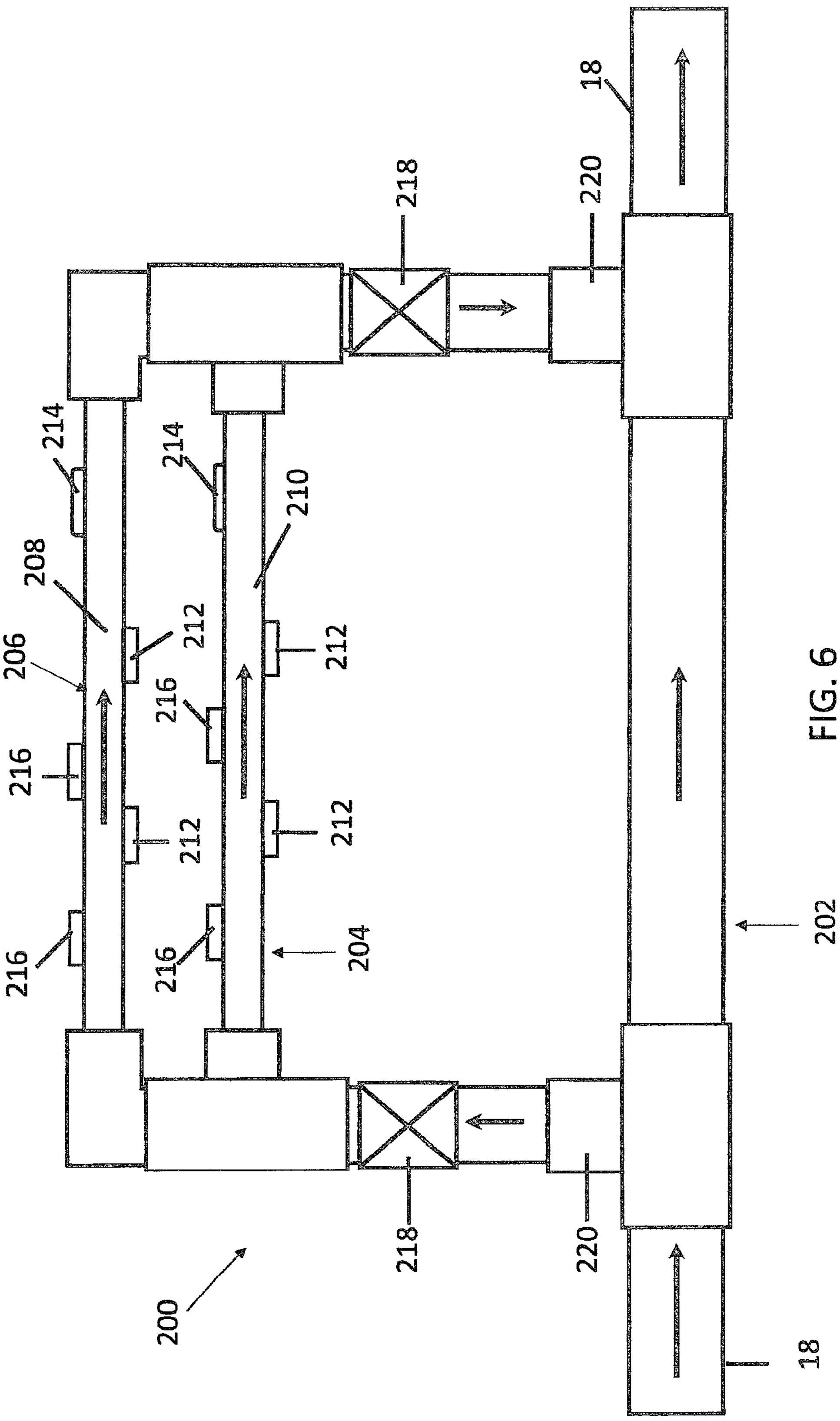
FIG. 6 is an elevational view of an another alternative embodiment of a detection system.

Turning to FIG. 6, another alternative embodiment of a detection system 200 is shown. Like systems 12 and 100, the system 200 is interposed in the surface production line 18. The detection system 200 comprises a first fluid path 202, a second fluid path 204, and a third fluid path 206. The first fluid path 202 is identical to the first fluid paths 38 and 102. The second fluid path 204 is identical to the second fluid path 40.

The third fluid path 206 extends in parallel flow relationship to the second fluid path 204 and comprises a channel 208. Like the second fluid path 204, the third fluid path 206 has interior walls that define an environment in which a fluid ingredient deposits on its interior walls at a rate greater than the base rate range. This ingredient may be the same, or more preferably different from, the ingredient for which deposition is monitored within a channel 210 in the second fluid path 204. For example, the channel 208 may comprise a material capable of inducing and accelerating the formation of scale deposits, while a channel 210 may comprise a material capable of inducing and accelerating the formation of wax deposits.

Like the channels 46 and 106, each channel 208 and 210 may be exposed to a sensor 214 and have attached heating components 212 and ultrasonic components 216. A plurality of valves 218 may isolate both the second and third fluid paths 204 and 206 from the flow of fluid in the pipeline network 14. In alternative embodiments, additional valves may be included in each channel in order to isolate a single channel at a time. A plurality of sensors 220 may also be positioned between the surface production line 18 and the channels 208 and 210. The sensors 220 may be used to monitor the condition of fluid entering the channels 208 and 210. The sensors 220 may be flow, pressure or temperature sensors.

The first fluid path 202 is positioned below the second and third fluid paths 204 and 206 in FIG. 6. In alternative embodiments, the first fluid path 202 may be positioned above the second and third fluid paths 204 and 206. The channels 208 and 210 are straight. In alternative embodiments, the channels 208 and 210 may have a coiled shape or other desired shape. In further alternative embodiments, the system 200 may comprise more than two fluid paths. Each additional fluid path may be configured to induce and accelerate the deposition of other substances known to deposit on the pipeline network 14.

The detection systems 12, 100, and 200 may each be supported on a stand. The detection systems 12, 100, and 200 may also be encased within a protective housing. Additionally, the control system 30 may be attached directly to such housing.

While the detection systems 12, 100, and 200 have been described herein with reference to an oil and gas operation, the systems 12, 100, and 200 may be used in any operation where a fluid is recovered. For example, the systems 12, 100, and 200 may be used when recovering fresh water.

Changes may be made in the construction, operation and arrangement of the various parts, elements, steps and procedures described herein without departing from the spirit and scope of the invention as described in the following claims.

The invention claimed is:

1. A system, comprising:

a pipeline network formed from pipes having interior wall surfaces;

a fluid flowing through the pipeline network and having an ingredient that deposits on the interior wall surfaces at a base rate range;

a detection system interposed in the pipeline network and having two or more flow paths extending therethrough in a parallel flow relationship, the flow paths comprising:

a first fluid path; and a second fluid path having interior walls defining an environment, in which the environment is characterized by a coating on the interior walls that causes the fluid ingredient to deposit at a rate greater than the base rate range;

the detection system further comprising:

a sensor exposed to the second fluid path and responsive to the deposition of the ingredient on the interior walls of the second fluid path.

2. The system of claim 1 further comprising:

a third fluid path in a parallel flow relationship to the second fluid path and having interior walls defining an environment in which the fluid ingredient deposits on the interior walls of the third fluid path at a rate greater than the base rate range.

3. The system of claim 1 further comprising:

a heating component attached to the second fluid path.

4. The system of claim 1 in which the coating comprises one or more mineral ingredients.

5. The system of claim 1 in which the coating is formed from one or more hydrophobic materials.

6. The system of claim 1 in which the sensor is a flow sensor.

7. The system of claim 1 in which the sensor is a temperature sensor.

8. The system of claim 1 in which the sensor is a pressure sensor.

9. The system of claim 1 in which the second fluid path has opposed first and second ends, and further comprising:

a first valve interposed in the second fluid path adjacent its first end; and a second valve interposed in the second fluid path adjacent its second end.

10. The system of claim 1 in which the ingredient is scale.

11. The system of claim 1 in which the ingredient is wax.

12. The system of claim 1 in which the second fluid path is configured to be selectively isolated from fluid flow within the pipeline network.

13. The system of claim 1 further comprising:

an ultrasonic component attached to the second fluid path.

14. The system of claim 1 in which the first fluid path has interior walls defining an environment having an ingredient-deposition rate within the base rate range.

15. The system of claim 14 in which the ingredient is characterized as a first ingredient, and the first ingredient deposits on the interior walls of the second fluid path and a second ingredient deposits on the interior walls of the second fluid path, in which the first ingredient is different from the second ingredient.

16. The system of claim 1, further comprising:

a chemical injector configured to deliver a chemical to a wellbore; and a control system configured to receive and analyze values detected by the sensor and transmit commands to the chemical injector.

17. The system of claim 16 in which the chemical inhibits the deposition of the fluid ingredient on the interior wall surfaces of the pipeline network.

18. A method of using the system of claim 16, comprising:

detecting a change in the environment within the second fluid path using the sensor;

sending values detected by the sensor to the control system;

analyzing the potential for ingredient deposition based on the detected values using a processor included in the control system;

transmitting commands from the control system to the chemical injector; and injecting the chemical into the wellbore.

19. A system, comprising:

a pipeline network formed from pipes having interior wall surfaces;

a fluid flowing through the pipeline network and having an ingredient that deposits on the interior wall surfaces at a base rate range;

a detection system interposed in the pipeline network and having two or more flow paths extending therethrough in a parallel flow relationship, the flow paths comprising:

a first fluid path; and a second fluid path having interior walls defining an environment, in which the environment is characterized by packed particles that are interposed within the second fluid path and cause the fluid ingredient to deposit at a rate greater than the base rate range;

the detection system further comprising:

a sensor exposed to the second fluid path and responsive to the deposition of the ingredient on the interior walls of the second fluid path.

20. The system of claim 19, in which the packed particles comprise one or more mineral ingredients.

21. The system of claim 19 in which the packed particles are formed from one or more hydrophobic materials.

22. A system, comprising:

a pipeline network formed from pipes having interior wall surfaces;

a fluid flowing through the pipeline network and having an ingredient that deposits on the interior wall surfaces at a base rate range;

a detection system interposed in the pipeline network and having two or more flow paths extending therethrough in a parallel flow relationship, the flow paths comprising:

a first fluid path;

a second fluid path having interior walls defining an environment in which the fluid ingredient deposits on the interior walls of the second fluid path at a rate greater than the base rate range; and a third fluid path in a parallel flow relationship to the second fluid path and having interior walls defining an environment in which the fluid ingredient deposits on the interior walls of the third fluid path at a rate greater than the base rate range;

the detection system further comprising:

a sensor exposed to the second fluid path and responsive to the deposition of the ingredient on the interior walls of the second fluid path.

* * * * *